US008458586B2

(12) United States Patent
Schluter

(10) Patent No.: US 8,458,586 B2
(45) Date of Patent: Jun. 4, 2013

(54) X/HTML SUPPORT FOR SILVERLIGHT APPLICATIONS

(76) Inventor: Jasim George Schluter, North Sydney (AU)

( * ) Notice: Subject to any disclaimer, the term of this patent is extended or adjusted under 35 U.S.C. 154(b) by 68 days.

(21) Appl. No.: 13/048,306

(22) Filed: Mar. 15, 2011

(65) Prior Publication Data

US 2011/0225488 A1    Sep. 15, 2011

(30) Foreign Application Priority Data

Mar. 15, 2010    (AU) ................. 2010901079

(51) Int. Cl.
G06F 17/00    (2006.01)
G06F 9/44    (2006.01)

(52) U.S. Cl.
USPC ........... 715/239; 715/201; 715/209; 715/249; 715/760; 717/115; 717/178

(58) Field of Classification Search
USPC .......... 715/200–205, 207–209, 226, 234, 715/249, 255, 239, 256, 273, 700, 760, 762, 715/763; 717/108, 109, 111, 114, 115, 116, 717/165, 178
See application file for complete search history.

(56) References Cited

U.S. PATENT DOCUMENTS

| 2005/0108629 | A1 | 5/2005 | Relyea et al. | |
| 2005/0257129 | A1 | 11/2005 | Kreiner et al. | |
| 2007/0288657 | A1 | 12/2007 | Koskimies | |
| 2009/0106104 | A1* | 4/2009 | Upendran et al. | 705/14 |
| 2009/0276696 | A1* | 11/2009 | Kapoor et al. | 715/252 |
| 2009/0327922 | A1 | 12/2009 | Van Ness et al. | |
| 2010/0115401 | A1* | 5/2010 | Nordine et al. | 715/255 |
| 2010/0146379 | A1* | 6/2010 | George et al. | 715/234 |
| 2010/0153839 | A1* | 6/2010 | Wilkins | 715/235 |
| 2010/0235806 | A1* | 9/2010 | Mohan | 717/100 |
| 2011/0202424 | A1* | 8/2011 | Chun et al. | 705/26.8 |

FOREIGN PATENT DOCUMENTS

WO    2008043050    4/2008

OTHER PUBLICATIONS

Robison, L. "The Microsoft .NET Framework 3.0: Building Next-Generation Windows Applications, Version1" published Oct. 16, 2007. retrieved from http://wiki.cac.washington.edu/download/attachments/796502/themicro1400.pdf.
Delay, "Bringing a bit of HTML to Silverlight" published Sep. 10, 2007. retrieved from http://blogs.msdn.com/b/delay/archive/2007/09/10/bringing-a-bit-ofohtml-to-silverlight-htmltextblock-makes-rich-test-display-easy.aspx.
Bothner, P. "XML Challenges to Programming Language Design" published Jan. 23, 2007. retrieved from http://web.archive.org/web/20070123030712/http://p-cos.net/lisp-ecoop/submissions/Bothner.pdf.

* cited by examiner

Primary Examiner — Maikhanh Nguyen
(74) Attorney, Agent, or Firm — Sand & Sebolt

(57) ABSTRACT

A method for creating a web application adapted to run in a Silverlight® run time environment from an X/HTML source file. The visual elements of the X/HTML source are converted to a corresponding Silverlight® custom control with a comparable visual presentation. The X/HTML source file is first converted to XAML which is then combined with the Silverlight custom controls into a web application.

15 Claims, 10 Drawing Sheets

Fig. 1
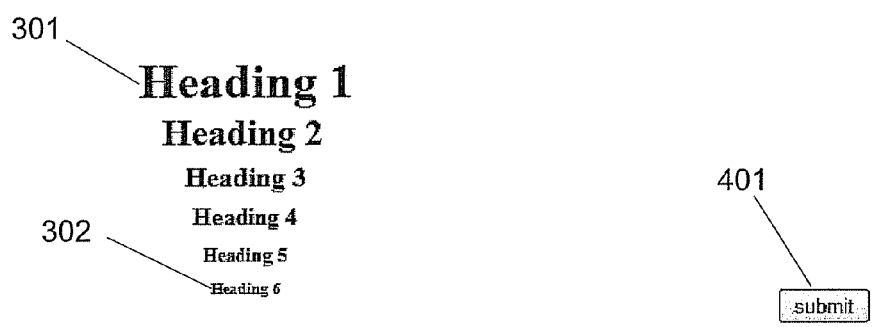
Fig. 2
301
Heading 1
Heading 2
Heading 3
Heading 4
302
Heading 5
Heading 6
Fig. 3
401
submit
Fig. 4

| Embodiment | Input | Processing | Output |
|---|---|---|---|
| 1 | From Client Application | P2 | To Client Application |
| 2 | From Client Application | P2 | To Screen |
| 3 | From Tool (File Dialog) | P2 | To File |
| 4 | From Tool (File Dialog) | P2 | To Project |
| 5 | From Tool (File Dialog) | P2 | To Designer Surface |
| 6 | From Current Website | P2 | To Silverlight Screen |

Fig. 18

X/HTML SUPPORT FOR SILVERLIGHT APPLICATIONS

FIELD OF THE INVENTION

The field of the invention resides in the area of computer programs and moreover, convertors for converting computer files from one format into another. Specifically, the invention relates to methods for taking HTML and/or XHTML information (hereon referred to as X/HTML) and converting it into Microsoft Silverlight™ ("hereafter Silverlight") format with customisable visual presentation.

BACKGROUND TO THE INVENTION

The delivery of content via the World Wide Web (www or web) has been determined, to a large degree by the specification of file types and protocols for the encoding of the delivered content.

HTML was the first specification that was commonly accepted by publishers of information on the internet, as well as those organisations that built the web browsers for parsing the published information so that the information was displayed on the users screen as intended by the publisher.

Early specifications of the HTML standard were very text based and did not deal with multimedia elegantly. Consequently, web developers were unable to provide in early websites, the rich interactivity that applications that ran in the user's operating system provided.

As a result of this, many browser plug-ins providing runtime environments were developed such as Adobe Flash, Sun Microsystems Java and Microsoft Silverlight. These plug-ins allowed a publisher to deliver binary code over the internet that would execute in the plug in run time environment resulting in a rich user experience that allowed the development of "web apps" or applications that are delivered through the user's browser that appear to be applications like any other application that would run on a user's computer in their operating system environment.

The increase in the information stored and marked up in X/HTML has resulted in the need for increased X/HTML compatibility in plug ins that have their own different standards and document formats.

It would be desirable to be able to have one of the more modern runtime environments be able to use X/HTML element as its own as the majority of data online is available as X/HTML. It would be desirable that Silverlight executables which run in the Silverlight run time environment be able to contain the X/HTML that has come from these increasing sources.

Silverlight is a rich internet application platform which has many modern features such as styling, templating, being programmable in different computer languages and having a large library of functions. It would be desirable for X/HTML to be able to be taken into Silverlight to use its modern features.

Another benefit of having X/HTML compatibility in Silverlight Applications is that the developer can keep pre-existing investments in Content Management Systems that are great with creating X/HTML and have that passed into Silverlight.

A third benefit of improved X/HTML compatibility in Silverlight would be that it could speed up the creation of Silverlight Applications. X/HTML documents can form the starting point for a new application.

A fourth benefit to X/HTML compatibility in Silverlight is that of skill reuse. Professional skilled X/HTML creators could create the X/HTML that forms the data and meaningful mark up and then style, template, and mix the X/HTML in with Silverlight controls and application code in order to write a Silverlight Application.

A fifth benefit to X/HTML compatibility in Silverlight is that it would provide a way for X/HTML to be used in Silverlight editors such as the design tool Expression Blend and the programming tool Visual Studio which aid Silverlight designers and developers to create applications.

This desire for Silverlight to be more compatible with X/HTML is shared amongst those skilled in the art.

Notwithstanding a long felt want in the area, there is no method or product available to make Silverlight work with X/HTML like it does with its own Silverlight controls. It would appear that the failure to develop a method or product to do this is a result of the following obstacles:

(1) the set of Silverlight controls that are packaged with Silverlight are not equivalent to the set of X/HTML elements. Whilst it is possible to use the closest set of controls in Silverlight to the X/HTML by changing the names of the X/HTML elements used in the source document to the closest match in the Silverlight elements, changing the name leads to a loss of the markup which is meaningful (for example, a <footer> element means the contents is a footer, renaming it to an Silverlight control will lose this name). There is large number of elements without a close match and prior art simply drops support for these elements.

(2) Silverlight uses XAML not X/HTML as a markup language. However converting X/HTML to XAML is useless as the Silverlight Plug-in requires there to exist Silverlight controls with the elements and attributes the X/HTML has used.

(3) The complete process of creating the missing Silverlight custom controls with the same element and attribute names, correcting any incompatibilities in X/HTML document to the XAML document format and the final step of adding that XAML to a Silverlight Application along with the missing controls has been considered too difficult to be achievable.

Therefore making Silverlight more compatible with X/HTML hasn't been provided in an extensive way that makes the X/HTML work the way Silverlight does.

There have been a few partial solutions to converting X/HTML to Silverlight. These include:

(1) HTML overlay, this is where the X/HTML is put in a div or iframe and overlayed on top of the Silverlight Application. A limitation of this is that the overlayed X/HTML is not visually presented by Silverlight and misses out on the Silverlight plug-ins capabilities. Another limitation is that it's not part of the Silverlight Application and is therefore not really converted, but simply shown on top of the Silverlight Application.

(2) Silverlight 4 will have a browser control which will handle X/HTML but not in all situations, it will allow the Silverlight Application to show X/HTML when the application is running in Out-Of-Browser mode, which is when it is running as a desktop application. This has many limitations, first it doesn't work while the application is running in the browser, second the browser control doesn't convert the X/HTML to XAML for editing or saving; thirdly this doesn't provide the individual controls needed to create a nested tree, that is it doesn't convert the X/HTML DOM to the Silverlight Object Model. The last two points are important as the developer won't be able to manipulate the result, nor restyle it.

(3) Rename X/HTML to closest XAML. This partial solution describes converting the X/HTML by renaming it to Silverlight XAML that matches some of the functionality. For example, converting a <h1> element to the XAML <TextBlock Fontsize="15"> element. This doesn't keep the Mark-up information that the element implies, that is that the text is the First Heading. Nor does it provide the custom control h1 that would be required to do so. Instead it reuses existing controls like the TextBlock, changing settings on these controls to mimic the look the browser gives the X/HTML or to simply present the data portion of the hypermedia document. This solution is manually trying to mimic the look and feel of X/HTML while being very limited to text and the few Silverlight controls that are similar to X/HTML.

Each of these attempts has failed to provide a robust method for accurately converting X/HTML to Silverlight formatted documents.

Persons skilled in the art have been discouraged from producing a tool of the present invention because they have been misguided by conventional thinking. Conventional thinking is that Silverlight is too different to X/HTML. Generally prior art attempts at providing a convertor of the present invention have resorted to providing either custom controls for Silverlight or providing an HTML to XAML parser for Silverlight or WPF/E.

The majority resign to either overlaying the X/HTML or reading the text of the X/HTML document in and then showing it as plain text on screen.

Neither of these approaches would result in an adequate tool for conversion. These approaches cannot convert X/HTML and make it flexible for the developers. The functions that would be absent are the templating features, the ability to relate the X/HTML to Silverlight controls predictably and the benefit to those skilled in X/HTML that the Silverlight XAML created is named similar to the X/HTML they are used to. The flexibility that comes from these features are that the styling and templating creates a larger control over the look of the document. The converting to unique Silverlight custom controls results in finer grained control over the resulting conversion, that is that the Silverlight programmer my choose to add and other Silverlight controls in to the converted document after the conversion or remove some of the converted X/HTML once it is in Silverlight object form.

It is an object of the present invention to overcome the X/HTML limitations in Silverlight and some of the stated deficiencies in the prior art and to provide a method to convert X/HTML to Silverlight Applications in such a way that the result can have its visual presentation customised.

SUMMARY OF THE INVENTION

According to the first aspect of the invention there is provided a method for creating custom Silverlight Application with customisable visual presentations from X/HTML standards, the method being carried out in the memory of a computing device having a processor adapted to process information the method comprising the following steps
P1. converting elements of the X/HTML specification into a series of Silverlight custom controls with the visual presentation attributable to the X/HTML elements.
P2. converting the X/HTML source file to XAML format.
P3. combining the outputted XAML and Silverlight custom controls into your Silverlight Application.
P1—Conversion of X/HTML elements into Custom Controls
Preferably the step of converting elements of the X/HTML specification into a series of Silverlight custom controls with the visual presentation attributable to the X/HTML elements is comprised of:

1. Identifying elements in the X/HTML information;
2. For each of the elements identified, creating a custom control with basic compatibility, that is with the attributes of that element;
3. add the unique features of the X/HTML elements identified to their corresponding custom control;
4. add the custom UI desired for the custom control.

Preferably the step of creating for each identified element, a custom control with basic compatibility, is comprised of the following steps:
1. Creating a specially named new class derived from the appropriate control class.
2. Create the attributes of the element in the class.

Preferably the step of creating a specially named new class is comprised of the following steps:
1. Identify the name of the element that you are creating a custom class to represent.
2. Identify whether the identified element conflicts with a keyword in the programming language, reserved word or other name in Silverlight, if there is no conflict, create a class with the name being the same as the element name, if there is a conflict, then prefix the class name with a prefix that removes the conflict.

Preferably the step of choosing an appropriate control class for an element is comprised of the following steps:
1. Identify whether the element contains sub elements (that is that the content model is not empty).
2. If the element can contain sub elements then the appropriate control class to inherit from is an items control class.
3. If the element can not contain any sub-elements the appropriate class to inherit from is a control class.

Preferably the step of creating the attributes of the element in the class Involves creating dependency property with the same name as the attribute.

Preferably the step of adding the unique features of the elements to their corresponding custom control is comprised of the following steps:
1. Setting up event handler attributes;
2. Setting up Visual state manager;
3. Add the abilities that mimic the X/HTML element.

Preferably the step of adding the custom UI desired for the custom control is comprised of the following steps:
1. Creating a generic.xaml file;
2. Creating the visual presentation of the element in the generic.xaml file;
3. Setting the default style key of the custom control to the type of that custom control.

Preferably the step of Create a generic.xaml file is comprised of the following steps:
1. In your class project, creating a folder called Themes;
2. Adding a new Silverlight Resource Dictionary named generic.xaml in the Themes folder. This is the default area for the visual presentation of custom controls.

Preferably the step of creating the visual presentation of the element in the generic.xaml file is comprised of the following steps:
1. Choosing how you would like the custom control to look. While this could match the browsers rendering of the control or the CSS styled look of the control, it CaO also vary away from the default look in ways that aren't possible in X/HTML or CSS;
2. Designing the look in XAML;
3. If there is to be nested controls (including text) in the element, add an ItemsPresenter in the position you would like the nested controls to appear;

4. Insert that XAML into the following elements:

```
<Style TargetType="customcontrol">
    <Setter Property="FontSize" Value="15"/>
    <Setter Property="FontFamily" Value="Times New
    Roman"/>
    <Setter Property="xhtml:Box.LayoutMode"
    Value="Inline"/>
    <Setter Property="Template">
        <Setter.Value>
            <ControlTemplate TargetType="customcontrol">
            Your XAML goes here
            </ControlTemplate>
        </Setter.Value>
    </Setter>
</Style>
```

5. Replace customcontrol in the above XAML with the name of the custom control.

Preferably the step of designing the look in XAML is comprised of the following steps:
1. Choose the appropriate designer tool for the creation on XAML, this may be Adobe Photoshop or Illustrator, it may also be Microsoft Expression Design or Expression Blend. It's important that the tool can either create XAML or be imported by Expression Blend and therefore converted to XAML;
2. Draw the control;
3. If you used a program other then Expression Blend import the created artwork into Blend;
4. Save the resulting XAML as it is the visual presentation of the custom control.

Preferably the step of setting the default style key of the custom control to the type of that custom control is comprised of the following steps
1. Create the public constructer of the custom control.
2. Insert the following line of code:

```
this.DefaultStyleKey = this.GetType( );
```

P2. Conversion of X/HTML to XAML

Preferably the step of converting X/HTML into XAML comprises the following steps:
1. X/HTML information is loaded into memory
2. If the X/HTML information is HTML information, then the file is converted to XHTML using the following process.
    a. Wrap quotes around the values of attributes.
    b. Set all attributes and elements to lower case.
    c. Close any elements which are left open.
    d. Extent any attribute values that are using shorthand notation.
3. Thereafter, or in the case of converting existing XHTML information, the process of converting XHTML to XAML involves the following:
    a. Prefix XHTML elements with the library address namespace XMLNS;
    b. Wrap the subject XHTML code into a user control. By wrapping the code into a user control, this results in a Silverlight control;
    c. Fix naming collisions.
4. Wrap in a valid control.
5. Output XAML.

P3—Combining the Results of the Above Processes to Create a Presentable Silverlight Object Tree Preferably the step of combining the created XAML and the custom controls into a Silverlight Application comprise the following steps:
1. Load the custom controls
2. Load the created XAML
3. Parse XAML to the XamlReader.Load( ) method
4. The method will return the root of the object tree.
5. This object tree can then be added to a running Silverlight Application

BRIEF DESCRIPTION OF THE DRAWINGS

In order that the invention may be readily understood and put into practical effect, reference will now be made to the accompanying figures, in which:

FIG. 1 is a graphical representation Of the tree structure which is common to XML documents.

FIG. 2 is a example of an HTML document. The HTML document has a tree structure.

FIG. 3 is a depiction of the rendering of the HTML h1->h6 elements.

FIG. 4 is a depiction of an HTML input button of type submit.

Figure 5:
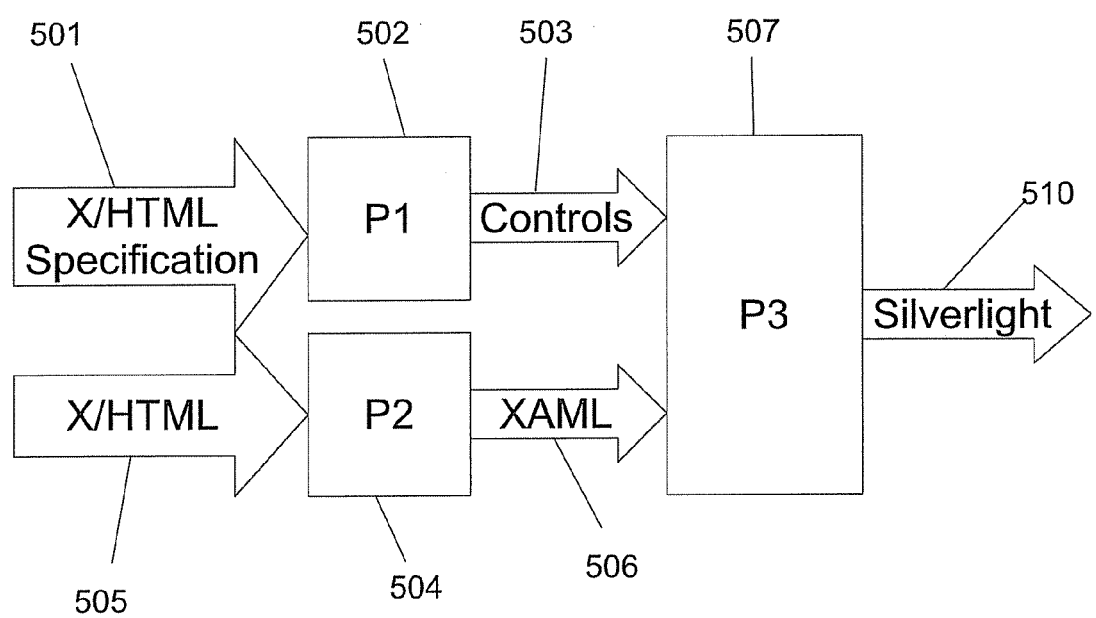
FIG. 5 is an overview of the three main inputs processes and outputs of the invention.

The client code passes html to the converter, the converter converts it to XAML. The client code receives that XAML and uses it.

FIG. 18 is a table of the possible uses of the converter using different inputs and different outputs.

DICTIONARY TERMS

Tree Structure: A formal structure for the organization of information called a Tree forms one of the basic data structures of Computer Science. The Tree data structure has a starting node called a root node and branches to children nodes in the tree. See FIG. 1.

Mark-Up: In the writing and publishing industry the term Mark-up was coined to represent the extra marks added to a writer's text as a higher level of communication between those working on the document. These marks would cover things like editing, proof reading and layout. In X/HTML the term Mark-Up is used to refer to the angular bracketed elements that wrap the data in the document, for example <h1>data</h1> is a mark-up element in X/HTML that means that the data is the first Heading in the document.

HTML: HTML is a standard way of creating hypermedia documents. It defines a set of Mark-up elements for adding meaning and context to hypermedia documents. Web designers choose the elements that express the meaning and context of the data in the document. See FIG. 2.

Visual Presentation: Computer monitors have tiny little dots that when properly activated, provide a full colour display. Software can change the brightness of these dots to create various visual presentations. X/HTML uses a descriptive computer language called CSS to define the visual presentation of the hypermedia document. Silverlight has a custom visual presentation system called Styling and Templating.

DOM: Document Object Model ("hereafter DOM") is the way that HTML is structured in a tree shape (as defined above). See FIG. 2.

XML: XML (Extensible Markup Language) is a set of rules for encoding documents electronically.

XHTML: XHTML is a XML encoding of HTML that provided stricter rules in how the document is to be marked-up. Many websites have moved their hypermedia documents to XHTML.

Browsers: X/HTML is most common format used on the internet to provide content for the World-Wide Web (hereon referred to as web). X/HTML is used on the web to create web sites. Browsers created by Microsoft, Apple, Google or other parties parse and display X/HTML.

CSS: Cascading style sheets are a way of declaring the style of a Web document.

Silverlight: Silverlight is a cross-browser, cross-platform and cross-device runtime environment provided by a browser plug-in that uses XAML and Microsoft .NET to provide rich applications over the internet. XAML is an XML encoded Mark-up language that is used to describe the application and is used in conjunction with the CLR .NET APIs. The XAML markup file (.xaml file) describes the application as a nested tree of controls. (Silverlight Object Model) These controls are implemented in a mixture of XAML and code written in a .NET language. Those controls are then able to be programmatically manipulated by code written in JavaScript or in a .NET language. The XAML markup as well as the code, is compiled into Silverlight assemblies which are then compressed using ZIP and stored in a .xap file. The Silverlight Application framework provides functionalities similar to those in Adobe Flash, integrating multimedia, graphics, animations and interactivity into a single runtime environment. Initially released as a video streaming plug-in, later versions brought additional interactivity features and support for .NET languages and development tools. The current version, 3.0, was released on Jul. 9, 2009. The next version is currently available in beta form.

Silverlight Applications: Throughout the specification reference is made to the term Silverlight Application. What is being referred to is the .xap executable file that executes in the Silverlight runtime environment. It is a binary file that executes as opposed to a traditional marked up text file such as an X/HTML file which is read or parsed by the browser it is loaded in. Whilst Silverlight Applications can be used to provide interactive applications via the run time environment in a properly configured browser, they can also be rendered to display static text.

WPF/E: Silverlight was codenamed WPF/E (Windows Presentation Foundation/Everywhere) by Microsoft during its development of the first release.

Silverlight Control Model: Silverlight has been designed to allow custom functionality to be encapsulated. Control logic is separated from its visual presentation. Separating the functionality from the visual presentation allows designers to change the look without having to re-implement the logic.

Custom Controls: The Silverlight control model allows for creating custom functionality and custom visual presentation called custom controls. Silverlight Custom Controls are controls not provided by Microsoft as part of Silverlight. Custom Controls are reusable in other Silverlight projects.

Styling and Templating in Silverlight: Styling and Templating is done by the Silverlight plug-in. Styling and Templating allows developers to change the look of a Silverlight control. Custom controls can have a generic style and template that can be overridden.

Computing Device: PC (desktop, laptop, netbook, palmtop), smartphones and related devices (iPhone, iPad. PSP), Embedded Devices (tivo, netflix or other STB with browser. Fridges with embedded browsers).

Plug-Ins: Browsers allow for extensions to their features via a mechanism called Plug-ins. A Plug-In is the name given to one of these extensions. Example plug-ins are Adobe Flash, Adobe Acrobat Reader and Microsoft Silverlight.

Development Environments Development Environment or Intergrated Development Environments (IDEs) are software applications that assist in the development of Software Applications. IDEs usually combine debugging, source editing and compiling within one environment.

DETAILED DESCRIPTION OF THE INVENTION

The field of the invention resides in the area of computer programs and software runtime environments and moreover, making a runtime environment execute a document type it was not designed to run. Specifically, the invention relates to a method of making the Silverlight Runtime execute X/HTML documents as if they were XAML documents and to do so in a way that doesn't lose information from said document.

This allows more than simply rendering X/HTML documents in Silverlight as if they were in the browser. It enables a level of compatibility that is true of Silverlight XAML documents, that is:
 a. Able to be mixed in with Silverlight Controls
 b. Participate in Silverlight Styling and Templating support
 c. Work in Silverlight Tooling such as Expression Blend and Visual Studio
 d. Enable programming in languages that Silverlight supports, including C# and Javascript.

It also keeps the information from the X/HTML document, the Element types, their nested structure, and the attributes of the elements and their assigned values. This enables a level of compatibility that no prior art provides to Silverlight for X/HTML, that is:
 a. No loss of property values
 b. No loss of the DOM structure of the document
 c. No loss of element types, including no loss of context adding mark-up (for example the HTML5 header element)
 d. Reuse of existing X/HTML knowledge in Silverlight.

1. Overview
1.1 Basic Processes in General

FIG. 5 depicts the three main processes of the present invention. P1 502 represents the first process of converting elements of the X/HTML specification 501 to custom controls 503 with the desired visual presentation. P2 504 represents the second process of converting X/HTML information 505 to XAML information 506. The final process, P3 507, combines the XAML 506 and the custom controls 503 into a Silverlight Application 510.

It is worth noting that for all the embodiments of the X/HTML to Silverlight converter, the P1 step occurs prior to the execution of the converter. The P1 step creates a library of Silverlight custom controls that are used in P3.

P2 for all embodiments remains a process of receiving X/HTML, changing the X/HTML using string manipulation, XLinq or other methods of modifying data and returning XAML. P2 can be created as an assembly that can be reused in all the embodiments along with the custom controls that result from P1.

1.2 Variations in Implementations

The processes P1-P3 of the present invention may be implemented and delivered in various ways. At the core of each method of delivery, however, are the three above described processes. In general terms, the processes P1-P3 can be embedded into Silverlight Applications for use dynamically on hosted X/HTML information sources, In a third party utility, or the processes P1-P3 can be implemented in a developer tool such as Microsoft Visual Studio. In the latter case, the invention is contained within a Visual Studio add-in which could for example add an option in the File Menu, "Import X/HTML and convert to XAML".

Variations generally depend on what environment the conversion is taking place and where/when it is called upon to convert X/HTML to a Silverlight Application.

Figure 15:
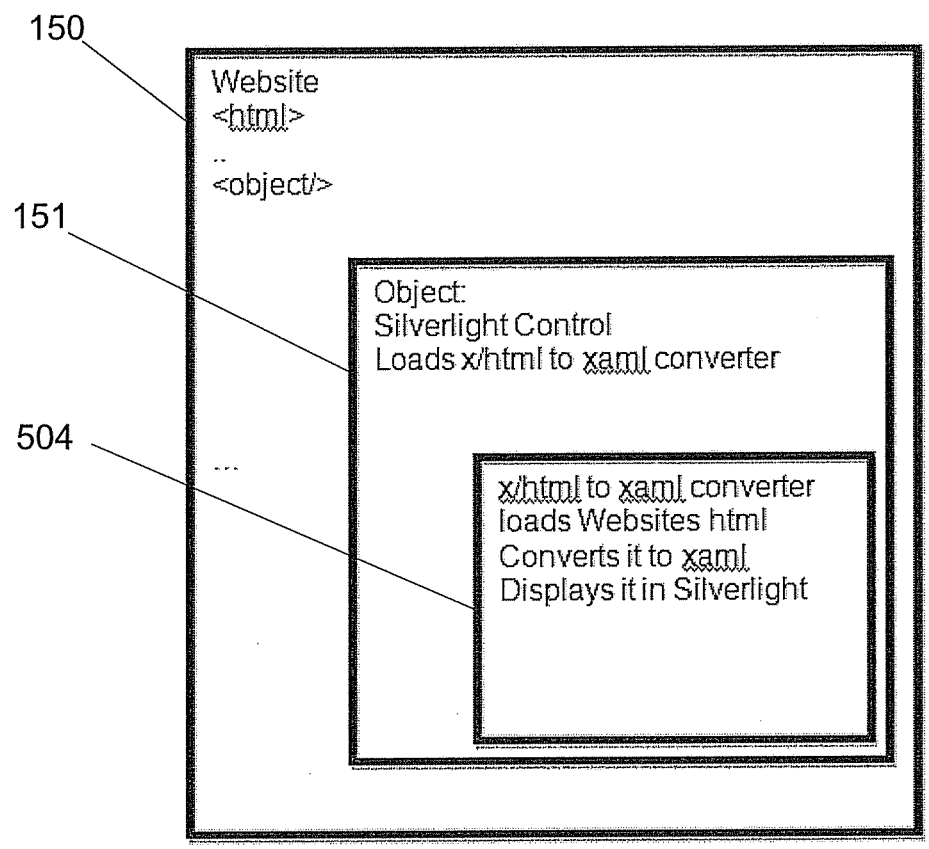
FIG. 15 is a diagram of using the Converter of FIG. 14, that is when the Website hosting the Silverlight Control loads, it loads the converter and that converter loads the HTML of the website and converts it and then displays it.

The possible sources of X/HTML and environments in which the processes are carried out include:
 (1) From Client Application (FIG. 17); in this embodiment, the converter takes the form of a Third party application 170 which has X/HTML to Silverlight requirements and is leveraging the custom controls in P1. The embodiment would implement a mechanism of passing in the X/HTML to the P2 504.
 (2) From Tool (File Dialog) (FIG. 16); in this embodiment, using a Tools extensibility mechanism 160, for example the add-in mechanism in Visual Studio, a Tool provides a way for the user to import X/HTML 505 into P2 504. (In this case as a File, Import Menu item.)
 (3) From Current Website; in this embodiment (FIG. 15)—a Silverlight Control 151 of the present invention is loaded on the X/HTML page 150, it in turn downloads the current websites X/HTML and passes it into P2 504 for parsing into XAML before being processed in P3. During execution, the embedded Silverlight Control loads the HTML of the website it is embedded in and converts it dynamically into a Silverlight Application for rendering by the Silverlight RTE. Embedded pages are handled in this manner because of object control in the X/HTML has a data="data:application/x-silverlight," and type="application/x-silverlight-2" which results in the browser loading the embedded Silverlight Application in the Silverlight RTE.

In all these cases P2 is not modified, it is simply dependent on the embodiment for its input.

The loaded Silverlight Application then goes about the process of P3 by:
 (1) Downloading the current websites X/HTML again and passing it directly in to the P2 process.
 (2) After receiving the object tree result of step (1) the Silverlight Application creates a screen in the browser.
 (3) The Silverlight Application then adding the resulting object tree to the screen in the browser.

P3 is dependent on P2 having been preformed and being provided with the resulting XAML. P3 is therefore not dependent on the conditions of which the X/HTML is received. The product of P3, however, will vary depending on the Output as shown in FIG. 18 and as described below.
 (1) To Client Application (FIG. 17); a Third party application that edits Silverlight content and wants to accept X/HTML as content too, will be required follow the steps that make up P3. The embodiment however decides where the instance of the object tree will end up (step 5, below). It the case of it returning to the Client Application, the Client Application doesn't add the control to a running Silverlight Application, it instead uses it as input for its own editor where it can then make further modifications to the output.
 (2) To Screen (FIG. 17); a Third party application that presents Silverlight Content and wants to accept X/HTML as content too, will be required to follow the steps that make up P3. The embodiment however decides where the returning object tree will be presented. For example it may decide that the converted X/HTML should appear in a browser window to the right of the inputted X/HTML therefore providing a comparison of the input to the output.
 (3) To File (FIG. 16); a tool that features this X/HTML to Silverlight converting system may decide that the output should be saved to a file. If it saves just the XAML than it only need to execute P2 and save the resulting XAML to disk using appropriate code to do so. If it is to save a Silverlight Application with the converted X/HTML then it is to do the following:
  a. Create a .XAP file (This is simply a ZIP file renamed XAP).
  b. Add the custom control library to the XAP
  c. Add the XAML as a .XAML file.
 (4) To Project (FIG. 16); a tool that contains projects, for example Visual Studio, may wish to add the resulting XAML of P2 to the project. In this case P3 is implemented by:
  a. Including the controls library in the project.
  b. Adding the resulting XAML as a file into the project.

Figure 16:
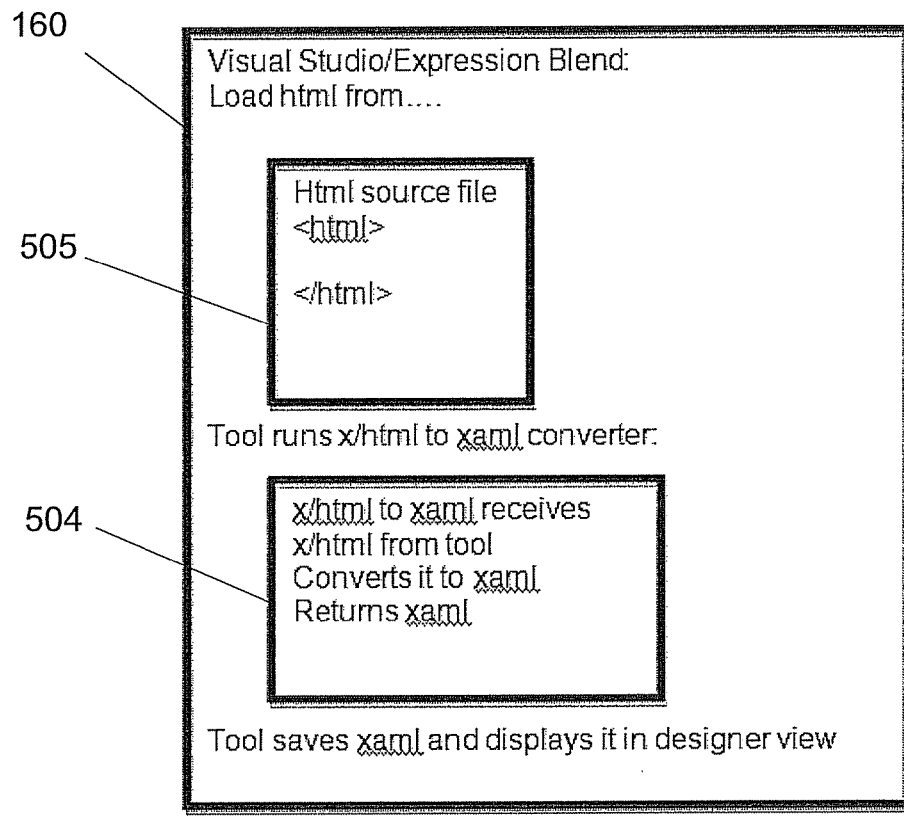
FIG. 16 is a diagram of using the Converter as part of a tooling scenario, that is that the tool, for example Visual Studio or Expression Blend provides a dialog asking for the html document to convert. The document is loaded. The tool passes the document to the converter. The converter returns XAML. The tool saves the XAML and uses its inbuilt designer screen to show the XAML.
Figure 17:
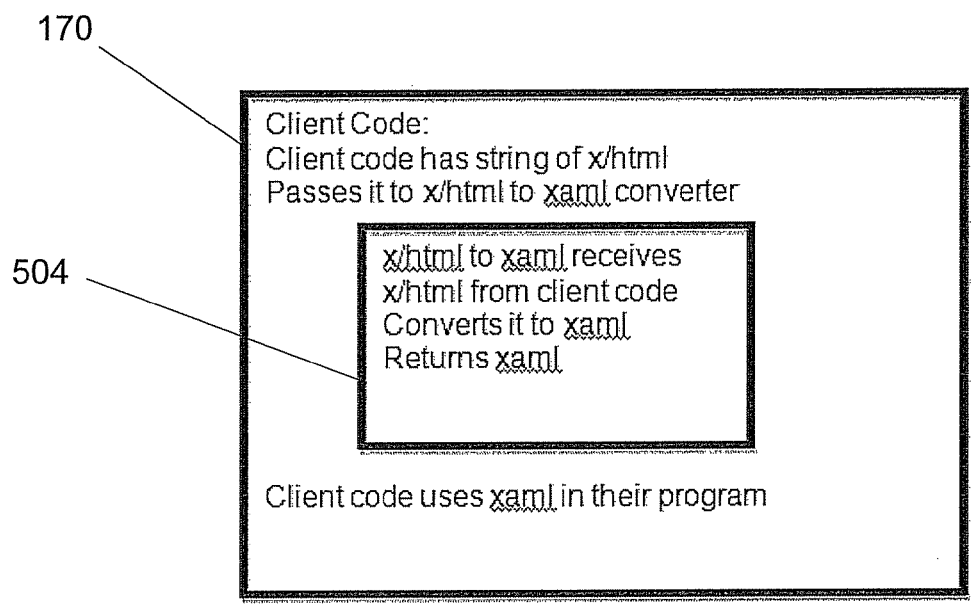
FIG. 17 is a diagram of using the Converter to add functionality to a application.

(5) To Designer Surface (FIG. 16); Tools with designer surfaces, that is preview windows that show what the XAML would look like if run as a Silverlight Application, (Expression Blend and Visual Studio are examples of tools with preview windows). These tools automatically show previews of XAML, therefore following the steps in 4 above will result in step 5.

(6) To Silverlight Screen; in this embodiment the P2 and P3 are added to a Silverlight Application along with the custom controls, the embodiment loads the X/HTML off the current website and creates a Silverlight screen in the browser that the resulting object tree is added to.

2. Creating Custom Controls (P1)

2.1 Example for Heading Control/Element

In HTML there is a element that allows the designer to make text into headings. There are six types that the designer can choose. <H1>301 is the largest and <H6>302 is the smallest as shown in FIG. 3.

FIG. 2 is an example of some HTML code 201 As with all html, there is an opening element 202, some items 203 and then the closing element 204. In a browser application engine, the convertor of the present invention looks for the first element and sees what it is. It then finds the closing element. Each HTML element is created into a Silverlight control. If it contains content, it will be an items control.

2.2 Example for Button Element

The button element can be used in forms for submitting or cancelling them. They can also be used for closing popup windows that the site has shown to inform the user.

An example of a button as drawn by Silverlight is shown as 401 in FIG. 4.

The button takes a name, type (button, reset and submit) and value (text) as its properties in the HTML.

The following is an example of a button in a form. The form can be a contact form on the website.

<BUTTON name="Submit" value="submit" type="submit">Send</BUTTON>

The button will submit the form data in the document as is specified in the X/HTML specification back to the server for processing.

2.3 Process for Creating a Button Control for the Html Button Element

The first thing to do is to find the button description for HTML 4.0 specification. This is at 17.5 The BUTTON Element (vvww.w3.org/TR/REC-html40/interact/forms.html#edef-BUTTON).

The element name is a button so the converter of the invention has to create a custom "button" control for Silverlight.

In the attributes list, the following are specified:

Name

Value

Type

Disabled

Tab Index

Access Key onfocus onblur

These attributes need to be converted into dependency properties. These form the attributes that the custom control will have which will be required by the XAML parser when the XAML is run in a Silverlight Application.

The browser inherently defines the look of the control in HTML. As we are creating a custom control in Silverlight, the implementer of the Silverlight custom controls needs to define the look. In Silverlight, the generic.XAML file is used to define the generic look of the control.

The generic.XAML file contains the look, font size, alignment, width, height, padding, etc of each control.

The following is the structure that forms the custom control that the implementer will need create for each of the X/HTML elements in the X/HTML specification in order to have a library of Silverlight custom controls (P1). The following is in reference to FIG. 6.

Figure 6:
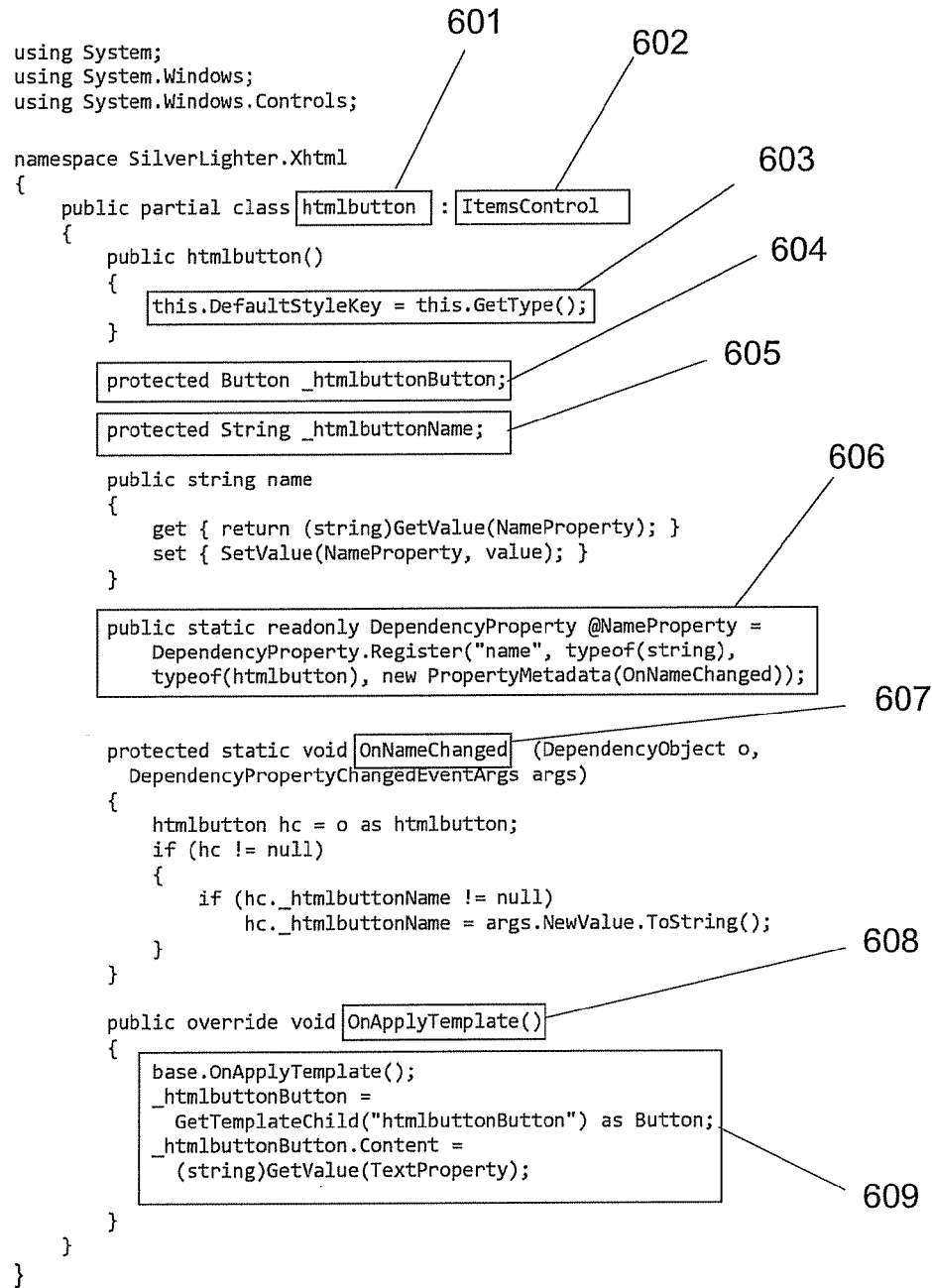
FIG. 6 is an example source file for a custom control that provides the button control for Silverlight.

601 Name of HTML Control: All custom controls will need to have a name. To make the XAML as compatible with the X/HTML as possible the same name is used in the custom control as the X/HTML element that the custom control implements. In the case of FIG. 6 this custom control was named htmlbutton as button was already a built in Silverlight control and naming collisions would have occurred.

602 All derive from ItemsControl as they can contain sub controls: Custom controls can be created from deriving from the control class, the contentcontrol class, the ItemsControl class or as a usercontrol. In the case of the element containing nested elements (for example a <p> tag containing many other tags) the custom control should derive from ItemsControl.

603 Sets this controls generic template to the one with that types name (in generic.XAML) file: The generic template is the generic (default) look of the element when it is displayed. The custom control is associated to the template via the line of code in FIG. 6 point 603, as that template is named the type name of the custom control.

604 Everything in the template of the control needs to be referenced in this control if any changes are to be made to that template control. The template may contain Silverlight controls that are built-in or provided by custom controls. To get and/or set the templates controls from within this custom control references to those controls are stored locally in the custom control. The step of storing the reference happens at point 609.

605 Convention_htmlbutton (control name) Name (attribute name on the HTML button). In the presented implementation a naming convention is used however the naming convention isn't mandatory as these are local variables that don't affect P2 or P3.

606 attribute names are available in XAML because they are created as dependency properties. The dependency property system is built into Silverlight and allows data binding.

607 Custom logic to handle the change (at least set) to an attribute of a control, (usual change is the updating of the user interface). The attributes are set in XAML or via data binding or code. In order for the custom control to retain that value and to drive functionality of the custom control the changing of the dependency properties value is captured as an event that fires. The setting of the internal variables and the running of logic related to the attributes is done in the change event.

608 Gets called by Silverlight when a template has been instantiated and is about to be rendered on the screen.

609 Code that sets references of the templates controls in the local variables for the custom control to access and manipulate later.

Custom controls all derive from ItemControl as it allows nesting of sub controls which is very common in X/HTML.

The this.gettype( ) hooks up to the generic style template in the generic.xaml.

The OnApplyTemplate method is the important step as Silverlight calls it This is where Silverlight looks up the button in the generic.XAML for the button definition.

Referring to FIG. 6, there is provided the following example for the button custom control which cross reference to the below:

601) The name htmlbutton instead of button is used as Silverlight has a button control and the names would collide.

602) ItemsControl is the base type as ItemsControl implements the feature of having nested content, something that button will need to show the text nested with the button.

603) This line binds the control to the visual presentation of the control which is located in the generic.xaml file.

604) This is the backing store for the button which will be created in the visual presentation. By having a reference to the button this control can change the values of the button.

605) HTML spec defines a name for the button, this will store that name.

606) To allow the advanced Silverlight feature of data binding, a DependencyProperty is created for the name property that calls OnNameChanged method whenever the name is changed.

607) This is the implementation of the OnNameChanged method.

608) OnApplyTemplate is the method called when the visual presentation is created and provides an opportunity to get the controls instantiated (for example the button) and create the local reference to that control.

609) Code for setting the local references of the templates controls.

3. Details of Converting X/HTML to XAML (P2)

Tables 1 and 2 demonstrate the action performed during P2 on HTML information that results in XAML. Table 1 contains the input XHTML and Table 2 the outputted XAML.

TABLE 1

XHTML

```
<!DOCTYPE html PUBLIC "-//W3C//DTD XHTML 1.0
Transitional//EN"
"http://www.w3.org/TR/xhtml1/DTD/xhtml1-transitional.dtd">
<html xmlns="http://www.w3.org/1999/xhtml">
<!-- saved from url=(0014)about:internet -->
<head>
        <title>Xhtml Test Suite Page</title>
        <script type="text/javascript" src="SilverLighter.js"></script>
</head>
<body>
        <div id="silverlightControlHost" style="width: 100%; height:
2000px; position: absolute;">
                <script type="text/javascript">
                        embedSilverlight("silverlightControlHost", "SLid",
"context");
                </script>
                <iframe style='visibility: hidden; height: 0; width: 0;
border: 0px'></iframe>
        </div>
        <button name="buttonName" type="button" value="1">Button
                Text
1</button>
        </body>
</html>
```

TABLE 2

XAML

```
UserControl xmlns:Xhtml="clr-
namespace:SilverLighter.Xhtml;assembly=SilverLighter.Xhtml"
xmlns:x="http://schemas.microsoft.com/winfx/2006/xaml"
xmlns="http://schemas.microsoft.com/winfx/2006/xaml/presentation">
        <Xhtml:html>
                <Xhtml:head>
                        <Xhtml:title>
                                <Xhtml:text Text="Xhtml Test Suite Page" />
                        </Xhtml:title>
                </Xhtml:head>
                <Xhtml:body>
                        <Xhtml:div id="silverlightControlHost">
                                <Xhtml:iframe frameborder="1"
scrolling="auto"></Xhtml:iframe>
                        </Xhtml:div>
                        <Xhtml:htmlbutton name="buttonName" type="button"
value="1">
                                <Xhtml:text Text="Button Text 1" />
                        </Xhtml:htmlbutton>
                </Xhtml:body>
        </Xhtml:html>
</UserControl>
```

The process of conversion of the above XHTML to XAML is as follows:

1. X/HTML is loaded
2. Prefix XHTML elements with the library address namespace XMLNS; that is the "Xhtml:" such that <html> becomes <Xhtml:html> and <div> becomes <Xhtml:div>
3. Wrap the subject XHTML code into a user control. By wrapping the code into a user control, this results in a Silverlight control; that is add the <UserControl> tag at the top and </UserControl> tag at the bottom.
4. Fix naming collisions. In this case <button> has a naming collision it is renamed <htmlbutton> being careful that the name matches the custom control name.
5. Wrap in a valid control. That is that the UserControl has the correct namespaces added: xmlns:Xhtml="clr-namespace:SilverLighter.Xhtml; assembly=SilverLighter.Xhtml" xmlns:x="http://schemas.microsoft.com/winfx/2006/xaml" xmlns="http://schemas.microsoft.com/winfx/2006/xaml/presentation"
6. Output XAML.

4. Details of Combining Xaml with Custom Controls (P3)

When it is desired to take the XAML (which is a document) and see it presented on the screen (which requires the custom controls) the P3 process is engaged.

Depending on the embodiment, the combining of the XAML and custom controls (P3) may be carried out in a third party application, in a tool, as a plug-in fora tool or in a Silverlight Application.

If the embodiment creates a XAML file then that file can be loaded in a Silverlight Application at any time in the future. In embodiments that bypass this file step the P3 process must load the XAML into memory as Silverlight objects manually via the XamlReader.Load( ) method that is provided by the Silverlight Plug-in.

During the P3 process the XamlReader.Load( ) takes in the XAML and assuming the custom controls are available, creates an in-memory running instance of the XAML with the custom controls, which it returns as a object tree. For more information on this step see:

http://msdn.microsoft.com/en-us/library/cc189076%28VS.95%29.aspx

What you end up with: What you end up with when combining XAML and custom controls (P3) is a Silverlight object tree that is in the computer memory and can be manipulated by a program or presented on a Silverlight screen.

5. Implementations 5.1 Development of the Invention in a Developer Tool

Whilst the invention has been described above with respect to FIG. 16 in a general sense, the following are a set of instructions as to how to implement the invention within a developer tool.

With respect to the present set of instructions, the following are requirements:

1. Microsoft Visual Studio
2. HTML to XAML Converter library (for P2)
3. Custom Controls library for HTML (from P1 for P3)

Figure 7:
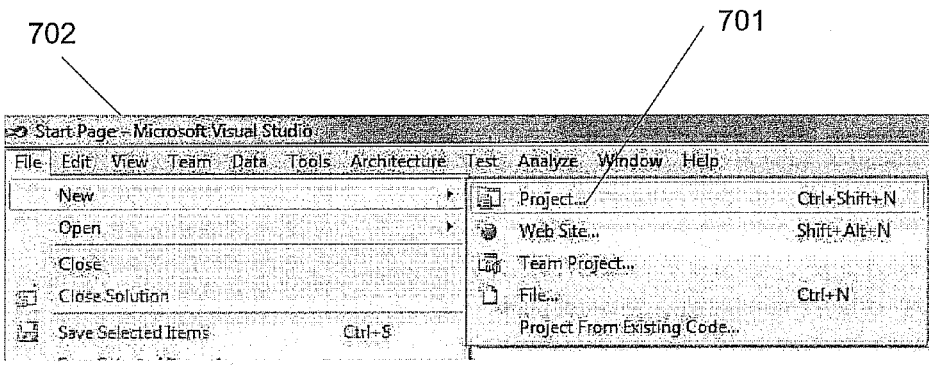
FIG. 7 is a screen shot of using Visual Studio to create a new project.

Referring to FIG. 7, Visual Studio is started and a New Project 701 is selected using the Start Page window 702.

Figure 8:
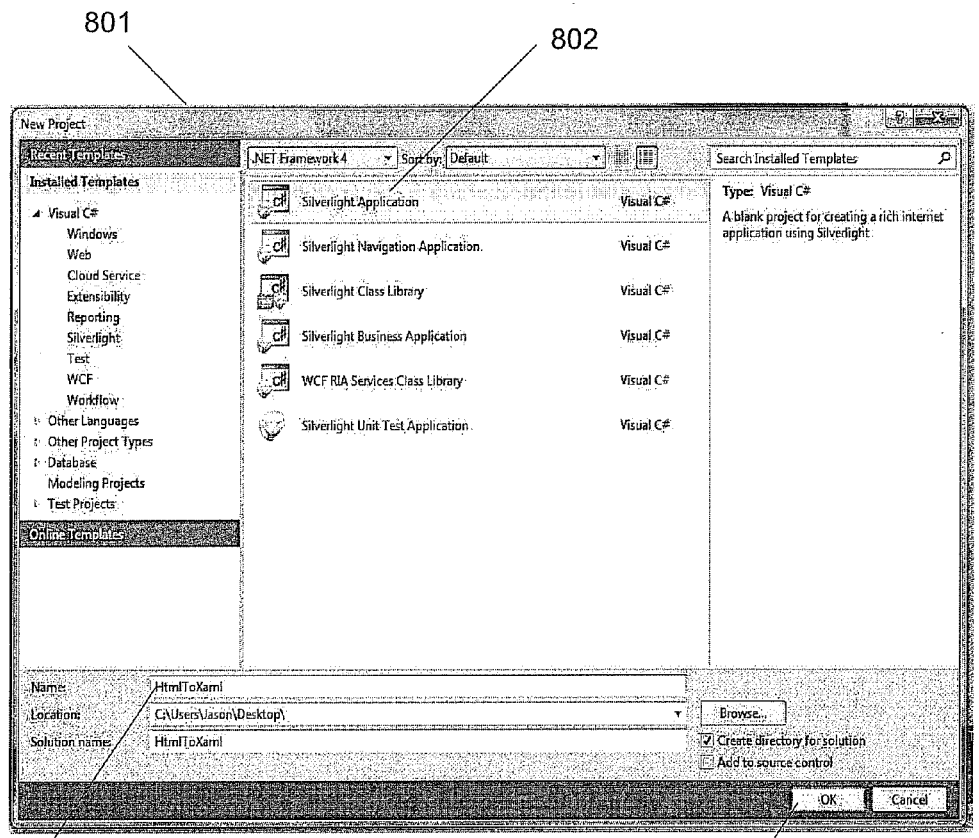
FIG. 8 is a screen shot of choosing the Silverlight project and setting its name to HtmlToXaml.

As shown in FIG. 8 a New Project window 801 will open. The operator can choose to use any .NET language. In the depicted case, a Silverlight Application in Visual C# 802 is selected as the project type to create. The project is named, in this case HtmlToXaml 803 and the OK button 804 activated.

Figure 9:
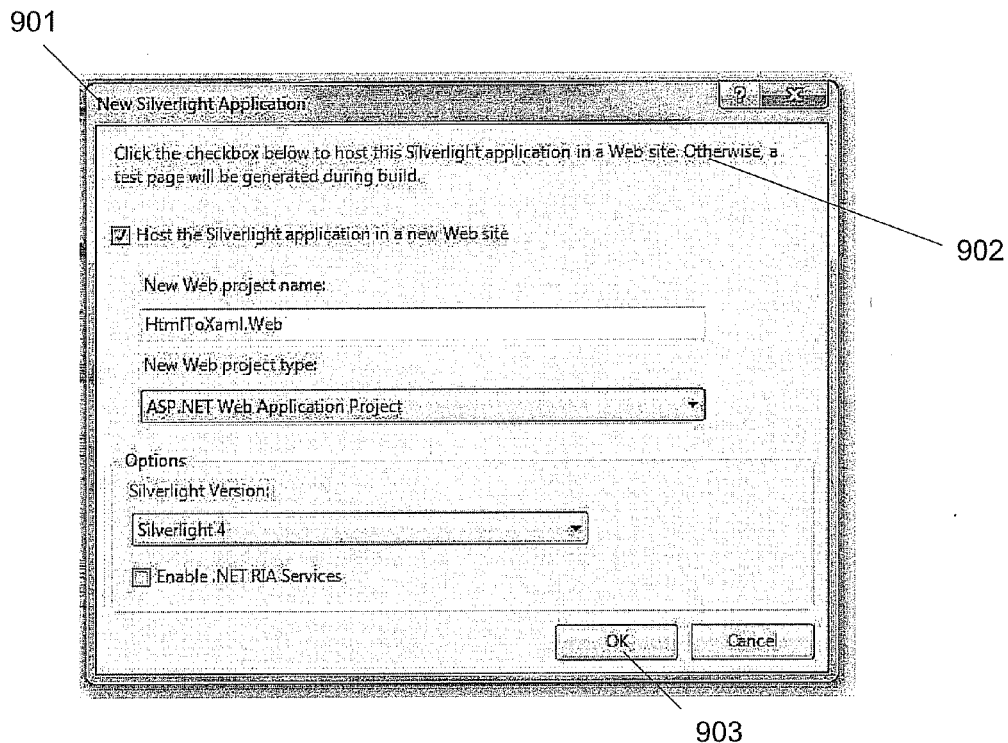
FIG. 9 is a screenshot of the New Silverlight Application Dialog that pops up after creating the project.

Next, in the New Silverlight Application window 901 as shown in FIG. 9, either a web site or a web application can be selected, it does not matter which type of application.

Figure 10:
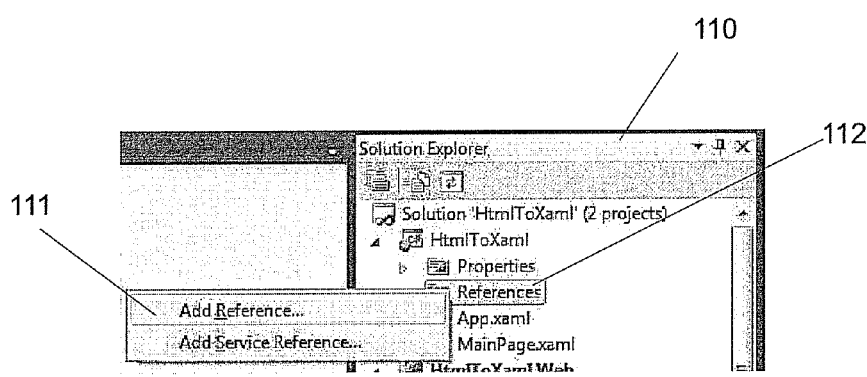
FIG. 10 is a screenshot of adding a Reference to the project. This is needed as the converter and the custom controls are added to the basic Silverlight project.
Figure 11:
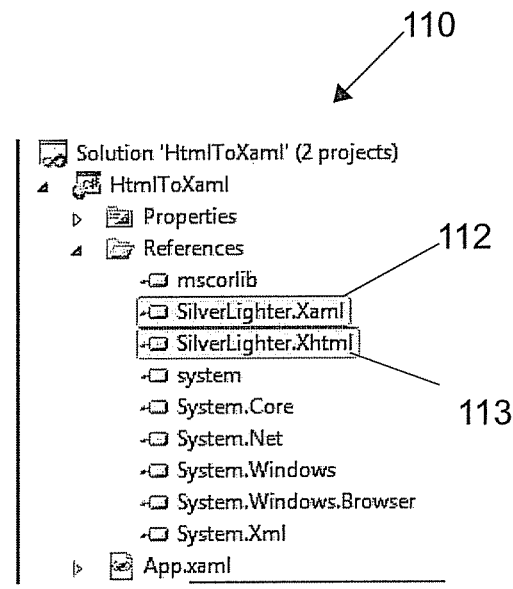
FIG. 11 is a screenshot of having added the SilverLighter.Xaml and SilverLighter.Xhtml libraries to the current project. In this example the SilverLighter.Xaml contains the method P2 and method P3 of the invention, which is the converter for X/HTML to XAML and the converter of XAML to a control. The SilverLighter.Xhtml contains the result of method P1 of the invention, which is the Custom Controls.

Next, as shown in FIGS. 10 and 11, the Solution Explorer window 110 is used to add references 111 to the x/html to XAML converter library 112 and the html custom controls 113, while these can be contained in an assembly or even several assemblies, in this example the converter assembly will be called SilverLighter.Xaml 112 and the controls SilverLighter.Xhtml 113.

Figure 12:
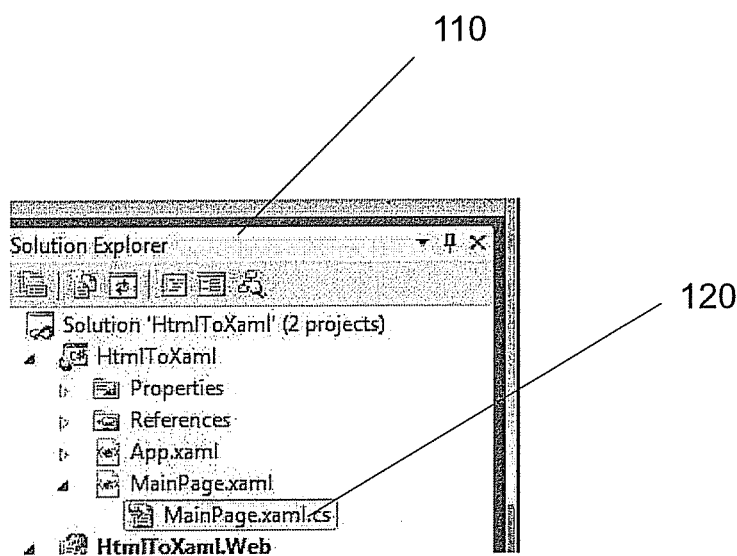
FIG. 12 is a screenshot of the MainPage.xaml.cs file. This file will host converter and will pass the current pages html to it and place the result on the screen.

Referring to FIG. 12, Open the code behind the main XAML page MainPage,xaml.cs 120.

Figure 13:
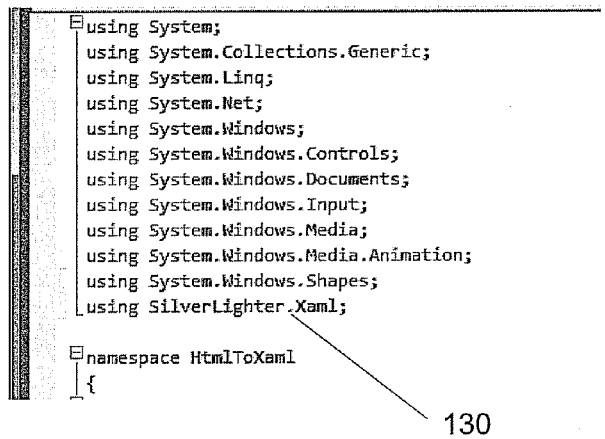
FIG. 13 is a screenshot of the using statements in the MainPage.xaml.cs the important using statement is the SilverLighter.Xaml; This represents the library containing the P2 and P3 methods; The other using statements may not be needed and could be removed.
Figure 14:
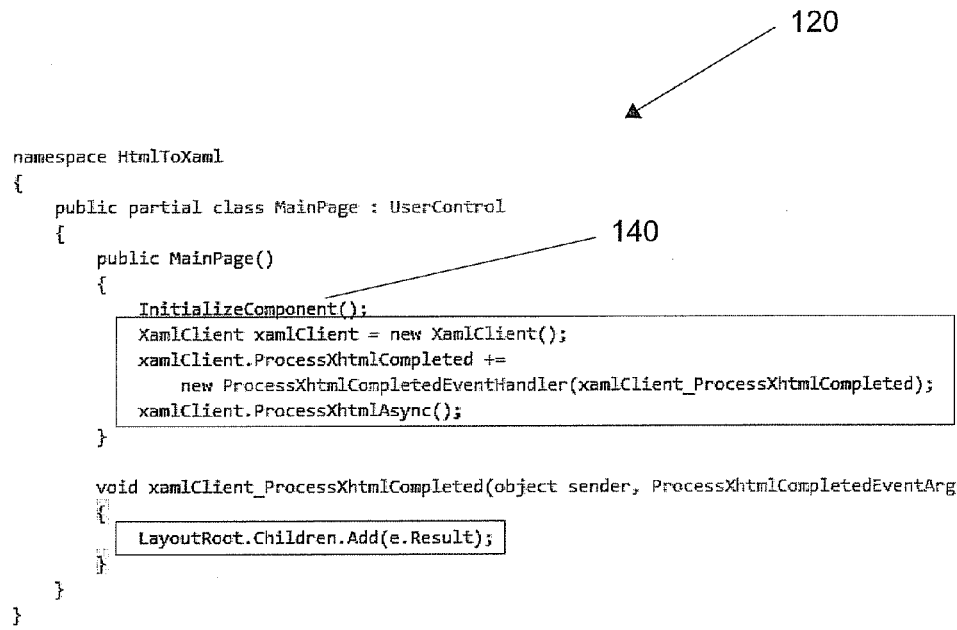
FIG. 14 is a screenshot of the hosting code needed to create a new xamlClient, which is the converter. ProcessXhtmlCompleted event is set up. ProcessXhtmlAsync is called and by default this implementation uses the hosting html page as the source if none is provided. Finally the LayoutRoot.Children.Add(e.Result) is the call to add the result of the conversion of the html to the Children of the Visual Presentation control (named LayoutRoot).

Referring to FIGS. 13 and 14:

```
XamlClient xamlClient = new XamlClient;
    xamlClient.ProcessXhtmlCompleted +=
        new
ProcessXhtmlCompletedEventHandler(xamlClient_ProcessXhtmlCompleted);
    xamlClient.ProcessXhtmlAsync( );
```

Browse for the SilverLighter.Xaml and SilverLighter.Xhtml and choose Add.
Open the code behind file of the main XAML page.
Add XmlClient and WebClient reference.
Call XmlWebClient.ProcessXMLCompleted method.
Call XmlWebClient.ProcessXMLAsync method. Can either current page or pass a url
The ProcessXMLAsync method processes the page to XAML.
In the ProcessXhtmlCompleted method:
Add Layoutroot.children.add (e.result)
Add some content onto the html page using the standard controls.
Build and run the solution.
A web browser session will start and the page is rendered as a Silverlight Application.

5.2 Development of a Dynamic X/HTML to Silverlight Application Embodiment As Shown in FIG. 18 Embodiment 6

The following set of instructions involve Microsoft Visual Studio 2010 Beta 2 along with Visual Studio Tools for Silverlight 4 beta. The requirements for making a dynamic X/HTML to Silverlight Application, however, are much less, and an editor is not required and the parser can be built in Silverlight 2 or higher. This embodiment assumes the provision of the P1 library of custom controls and an assembly containing both P2 and P3. Referring to FIG. 7—First create a new Silverlight Application by clicking on File, New Project . . . 701.

Referring to FIG. 8—In this example the solution will be named HtmlToXaml 803.

Referring to FIG. 9—To test the HtmlToXaml converter Visual Studio will ask if you if you want a test page 902, press OK 903.

Referring to FIG. 10—Right Click on References 112 in the HtmlToXaml project and choose Add Reference . . . 111.

Referring to FIG. 11—Add the Silverlighter.Xhtml 113 and SilverLighter.Xaml 112 libraries. The SilverLighter.Xhtml library contains all the custom controls created during the P1 step. The SilverLighter.Xaml library contains the implementation of P2 and P3. The SilverLighter.Xaml library contains a method called ProcessXhtmlAsync( ); this method reads in the current website and passes it to P2 where the X/HTML is converted into XAML. From there the same method passes the resulting XAML to P3 where it converts the XAML into a Silverlight object tree. The method then fires an event called_ProcessXhtmlCompleted. This returns the resulting Silverlight object tree to the Application.

Referring to FIG. 12—Expand the MainPage.xaml.cs 120 and open it.

Referring to FIG. 13—Add the using SilverLighter.Xaml reference 130 to the MainPage.xaml.cs file 120. This allows you to use the library in this code file.

Referring to FIG. 14—Typing in the following after the InitializeComponent( )method call 140:

Then add the following method to the class:

```
    void xamlClient_ProcessXhtmlCompleted(object sender,
    ProcessXhtmlCompletedEventArgs e)
    {
        LayoutRoot.Children.Add(e.Result);
    }
```

The next step involved in the process is to compile and run the application. The result is a Silverlight Application running in the browser that is the converted version of the X/HTML website hosting the application.

Examples of some of the custom controls that constitute the result of the step P1 are set out below. These examples correspond to the A, H1, BUTTON and U HTML elements.

| a.xaml.cs |
|---|

```csharp
using System;
using System.Windows;
using System.Windows.Controls;
namespace SilverLighter.Xhtml
{
    public partial class a : ItemsControl
    {
        public a( )
        {
            this.DefaultStyleKey = this.GetType( );
        }
        protected HyperlinkButton _aHyperlinkButton;
        protected Uri _aHref;
        protected string _aShape;
        protected TextDecorationCollection _aTextDecorations;
        public string Text
        {
            get { return (string)GetValue(TextProperty); }
            set { SetValue(TextProperty, value); }
        }
        public static readonly DependencyProperty TextProperty =
                DependencyProperty.Register("Text", typeof(string),
                typeof(a), new PropertyMetadata(OnTextChanged));
        protected static void OnTextChanged(DependencyObject o,
            DependencyPropertyChangedEventArgs args)
        {
            a hc = o as a;
            if (hc != null)
            {
                if (hc._aHyperlinkButton != null)
                    hc._aHyperlinkButton.Content =
                            (args.NewValue.ToString( ));
            }
        }
        protected Tooltip _aToolTip;
        public string title
        {
            get { return (string)GetValue(TitleProperty); }
            set { SetValue(TitleProperty, value); }
        }
        public static readonly DependencyProperty TitleProperty =
                DependencyProperty.Register("Title", typeof(string),
                typeof(a), new PropertyMetadata(OnTitleChanged));
        protected static void OnTitleChanged(DependencyObject o,
            DependencyPropertyChangedEventArgs args)
        {
            a hc = o as a;
            if (hc != null)
            {
                if (hc._aToolTip != null)
                    hc._aToolTip.Content =
                            (args.NewValue.ToString( ));
            }
        }
        public Uri href
        {
            get { return (Uri)GetValue(HrefProperty); }
            set { SetValue(HrefProperty, value); }
        }
        public static readonly DependencyProperty HrefProperty =
                DependencyProperty.Register("Href", typeof(Uri),
                typeof(a), new PropertyMetadata(OnHrefChanged));
        protected static void OnHrefChanged(DependencyObject o,
            DependencyPropertyChangedEventArgs args )
        {
            a hc = o as a;
            if (hc != null)
            {
                if (hc._aHref != null)
                    hc._aHref = new Uri(args.NewValue.ToString( ));
            }
        }
        public string target
        {
            get { return (string)GetValue(TargetProperty); }
            set { SetValue(TargetProperty, value); }
        }
```

-continued a.xaml.cs

```
        public static readonly DependencyProperty TargetProperty =
                DependencyProperty.Register ("target", typeof(string),
                typeof(a), new PropertyMetadata(OnTargetChanged));
        protected static void OnTargetChanged(DependencyObject o,
            DependencyPropertyChangedEventArgs args)
        {
                a hc = o as a;
                if (hc != null)
                {
                        if (hc._aHyperlinkButton != null)
                            hc._aHyperlinkButton.TargetName =
                                    (args.NewValue.ToString( ));
                }
        }
        public string shape
        {
                get { return (string)GetValue(ShapeProperty); }
                set { SetValue(ShapeProperty, value); }
        }
        public static readonly DependencyProperty ShapeProperty =
                DependencyProperty.Register("shape", typeof(string),
                typeof(a), new PropertyMetadata(OnShapeChanged));
        protected static void OnShapeChanged(DependencyObject o,
            DependencyPropertyChangedEventArgs args)
        {
                a hc = o as a;
                if (hc != null)
                {
                        if (hc._aShape != null)
                            hc._aShape =
                                    (args.NewValue.ToString( ));
                }
        }
        public TextDecorationCollection TextDecorations
        {
                get
                {
                        return
(TextDecorationCollection)base.GetValue(TextDecorationsProperty);
                }
                set
                {
                        if (value != null)
                        {
                            base.SetValue(TextDecorationsProperty,
(Enum)TextDecorationLocation.Underline);
                        }
                        else
                        {
                            base.SetValue(TextDecorationsProperty, 0);
                        }
                }
        }
        public static readonly DependencyProperty TextDecorationsProperty =
                        DependencyProperty.Register("TextDecorations",
typeof(TextDecorationCollection),
                typeof(a), new PropertyMetadata(OnTextDecorationsChanged));
        protected static void OnTextDecorationsChanged(DependencyObject o,
            DependencyPropertyChangedEventArgs args)
        {
                a hc = o as a;
                if (hc != null)
                {
                        if (hc._aTextDecorations != null)
                            hc._aTextDecorations =
                                    (TextDecorationCollection)args.NewValue;
                }
        }
        public override void OnApplyTemplate( )
        {
                base.OnApplyTemplate( );
                _aHyperlinkButton =
                GetTemplateChild("aHyperlinkButton") as HyperlinkButton;
                _aToolTip =
                        GetTemplateChild("aToolTip") as ToolTip;
                _aToolTip.Content =
                    ((string)GetValue(TitleProperty));
                _aHyperlinkButton.NavigateUri =
``` a.xaml.cs

```
            ((Uri)GetValue(HrefProperty));
        _aHyperlinkButton.TargetName =
            ((string)GetValue(TargetProperty));
    }
    internal enum TextDecorationLocation
    {
        Underline = 1
    }
  }
}
``` h1.xaml.cs

```
using System.Windows;
using System.Windows.Controls;
namespace SilverLighter.Xhtml
{
    public partial class h1 : ItemsControl
    {
        public h1( )
        {
            this.DefaultStyleKey = this.GetType( );
        }
        protected TextBlock _h1TextBlock;
        public string Text
        {
            get { return (string)GetValue(TextProperty); }
            set { SetValue(TextProperty, value); }
        }
        public static readonly DependencyProperty TextProperty =
            DependencyProperty.Register("Text", typeof(string),
            typeof(h1), new PropertyMetadata(OnTextChanged));
``` h1.xaml.cs -continued

```
        protected static void OnTextChanged(DependencyObject o,
            DependencyPropertyChangedEventArgs args)
        {
            h1 hc = o as h1;
            if (hc != null)
            {
                if (hc._h1TextBlock != null)
                    hc._h1TextBlock.Text =
                        args.NewValue.ToString( );
            }
        }
        public override void OnApplyTemplate( )
        {
            base.OnApplyTemplate( );
        }
    }
}
``` htmlbutton.xaml.cs

```
using System;
using System.Windows;
using System.Windows.Controls;
namespace SilverLighter.Xhtml
{
    public partial class htmlbutton : ItemsControl
    {
        public htmlbutton( )
        {
            this.DefaultStyleKey = this.GetType( );
        }
        protected Button _htmlbuttonButton;
        protected String _htmlbuttonName;
        protected String _htmlbuttonType;
        protected String _htmlbuttonValue;
        public string name
        {
            get { return (string)GetValue(NameProperty); }
            set { SetValue(NameProperty, value); }
        }
        public static readonly DependencyProperty @NameProperty =
            DependencyProperty.Register("name", typeof(string),
            typeof(htmlbutton), new PropertyMetadata(OnNameChanged));
        protected static void OnNameChanged(DependencyObject o,
            DependencyPropertyChangedEventArgs args)
        {
            htmlbutton hc = o as htmlbutton;
            if (hc != null)
            {
                if (hc._htmlbuttonName != null)
                    hc._htmlbuttonName = args.NewValue.ToString( );
            }
        }
```

-continued htmlbutton.xaml.cs

```
        public string type
        {
                get { return (string)GetValue(TypeProperty); }
                set { SetValue(TypeProperty, value); }
        }
        public static readonly DependencyProperty TypeProperty =
                DependencyProperty.Register("type", typeof(string),
                typeof(htmlbutton), new PropertyMetadata(OnTypeChanged));
        protected static void OnTypeChanged(DependencyObject o,
            DependencyPropertyChangedEventArgs args)
        {
                htmlbutton hc = o as htmlbutton;
                if (hc != null)
                {
                        if (hc._htmlbuttonType != null)
                                hc._htmlbuttonType = args.NewValue.ToString( );
                }
        }
        public string value
        {
                get { return (string)GetValue(ValueProperty); }
                set { SetValue(ValueProperty, value); }
        }
        public static readonly DependencyProperty ValueProperty =
                DependencyProperty.Register("value", typeof( string),
                typeof(htmlbutton), new PropertyMetadata(OnValueChanged));
        protected static void OnValueChanged(DependencyObject o,
            DependencyPropertyChangedEventArgs args)
        {
                htmlbutton hc = o as htmlbutton;
                if (hc != null)
                {
                        if (hc._htmlbuttonValue != null)
                                hc._htmlbuttonValue = args.NewValue.ToString( );
                }
        }
        public string Text
        {
                get { return (string)GetValue(TextProperty); }
                set { SetValue(TextProperty, value); }
        }
        public static readonly DependencyProperty TextProperty =
                DependencyProperty.Register("Text", typeof(string),
                typeof(htmlbutton), new PropertyMetadata(OnTextChanged));
        protected static void OnTextChanged(DependencyObject o,
            DependencyPropertyChangedEventArgs args)
        {
                htmlbutton hc = o as htmlbutton;
                if (hc != null)
                {
                        if (hc._htmlbuttonButton != null)
                                hc._htmlbuttonButton.Content =
                                    args.NewValue.ToString( );
                }
        }
        public override void OnApplyTemplate( )
        {
                base.OnApplyTemplate( );
                _htmlbuttonButton =
                    GetTemplateChild("htmlbuttonButton") as Button;
                _htmlbuttonButton.Content =
                    (string)GetValue(TextProperty);
        }
    }
}
``` u.xaml.cs

```
using System.Windows;
using System.Windows.Controls;
namespace SilverLighter.Xhtml
{
    public partial class u : ItemsControl
```

-continued u.xaml.cs

```
    {
        public u( )
        {
                this.DefaultStyleKey = this.GetType( );
        }
```

-continued u.xaml.cs

```
protected TextBlock _uTextBlock;
public string Text
{
        get { return (string)GetValue(TextProperty); }
        set { SetValue(TextProperty, value); }
}
public static readonly DependencyProperty TextProperty =
        DependencyProperty.Register("Text", typeof(string),
        typeof(u), new PropertyMetadata(OnTextChanged));
protected static void OnTextChanged(DependencyObject o,
    DependencyPropertyChangedEventArgs args)
{
        u hc = o as u;
        if (hc != null)
```

-continued u.xaml.cs

```
        {
            if (hc._uTextBlock != null)
                hc._uTextBlock.Text =
                    args.NewValue.ToString( );
        }
}
public override void OnApplyTemplate( )
{
        base.OnApplyTemplate( );
}
}
``` generic.xaml

```
<ResourceDictionary
    xmlns:x="http://schemas.microsoft.com/winfx/2006/xaml"
    xmlns="http://schemas.microsoft.com/winfx/2006/xaml/presentation"
    xmlns:controls="clr-
namespace:System.Windows.Controls;assembly=System.Windows.Controls"
    xmlns:vsm="clr-namespace:System.Windows;assembly=System.Windows"
    xmlns:xhtml="clr-namespace:SilverLighter.Xhtml">
    <!--<a href="uri">Anchor Element-->
    <Style TargetType="xhtml:a">
        <Setter Property="FontSize" Value="15"/>
        <Setter Property="FontFamily" Value="Times New Roman"/>
        <Setter Property="TextDecorations" Value="Underline"/>
        <Setter Property="xhtml:Box.LayoutMode" Value="Inline"/>
        <Setter Property="Template">
            <Setter.Value>
                <ControlTemplate xmlns:xhtml="clr-namespace:SilverLighter.Xhtml"
TargetType="xhtml:a" >
                    <HyperlinkButton x:Name="aHyperlinkButton">
                        <ItemsPresenter/>
                        <ToolTipService.ToolTip>
                            <ToolTip x:Name="aToolTip" Style="{StaticResource
ToolTipStyle}" Content="a link title"/>
                        </ToolTipService.ToolTip>
                    </HyperlinkButton>
                </ControlTemplate>
            </Setter.Value>
        </Setter>
    </Style>
    <!--<h1>1st Heading Element-->
    <Style TargetType="xhtml:h1">
        <Setter Property="FontSize" Value="32"/>
        <Setter Property="FontWeight" Value="Bold"/>
        <Setter Property="FontFamily" Value="Times New Roman"/>
        <Setter Property="VerticalAlignment" Value="Bottom"/>
        <Setter Property="xhtml:Box.LayoutMode" Value="Block"/>
        <Setter Property="Template">
            <Setter.Value>
                <ControlTemplate TargetType="xhtml:h1">
                    <xhtml:Box Height="Auto" Margin="0,15,0,19">
                        <ItemsPresenter/>
                    </xhtml:Box>
                </ControlTemplate>
            </Setter.Value>
        </Setter>
        <Setter Property="ItemsPanel">
            <Setter.Value>
                <ItemsPanelTemplate>
                    <xhtml:Box/>
                </ItemsPanelTemplate>
            </Setter.Value>
        </Setter>
    </Style>
    <!--<button>Button Element-->
    <Style TargetType="xhtml:htmlbutton">
        <Setter Property="Text" Value="Button"/>
        <Setter Property="xhtml:Box.LayoutMode" Value="Inline"/>
        <Setter Property="Template">
```

-continued generic.xaml

```
        <Setter.Value>
            <ControlTemplate TargetType="xhtml:htmlbutton">
                <Button x:Name="htmlbuttonButton" FontSize="12"
HorizontalAlignment="Left" Padding="9,3,9,2" VerticalAlignment="Bottom"/>
            </ControlTemplate>
        </Setter.Value>
    </Setter>
</Style>
<!--<u>Underline Element-->
<Style TargetType="xhtml:u">
    <Setter Property="xhtml:Box.LayoutMode" Value="Inline"/>
    <Setter Property="Template">
        <Setter.Value>
            <ControlTemplate TargetType="xhtml:u">
                <ItemsPresenter/>
            </ControlTemplate>
        </Setter.Value>
    </Setter>
    <Setter Property="ItemsPanel">
        <Setter.Value>
            <ItemsPanelTemplate>
                <xhtml:Box />
            </ItemsPanelTemplate>
        </Setter.Value>
    </Setter>
</Style>
</ResourceDictionary>
```

Persons skilled in the art will appreciate that various modifications can be made to the embodiments of the invention described without departing from the scope and ambit of the present invention. Further, the present invention whilst described by reference to X/HTML specifications of the past and present, the person skilled in the art will appreciate that the invention is intended to apply to future X/HTML specifications.

Javascript handling in Silverlight has been part of Silverlight since version 1. Since the XAML object tree is equivalent to the X/HTML DOM tree, the Javascript code doesn't need much change in order to work with the XAML. The main change to the Javascript is to its references to the X/HTML, these are changed to references to the XAML object tree. The custom controls add Javascript support by adding the [ScriptableMemberAttribute] to the controls. A Javascript library for the dynamic language runtime for Silverlight is used for enhanced compatibility. It is worth noting that Javascript support results in support for ASP.NET AJAX, jquery, and other Javascript libraries.

CSS converting is done via a passing through the style attributes and via downloading the .css files associated with the X/HTML document. Silverlight styling is similar to CSS and the conversion is from the CSS to the Silverlight Styling equivalent. These styles are added as style attributes to the generated XAML and .css files are converted to resource dictionaries.

Mixing X/HTML with Silverlight can be done via converting the X/HTML into Silverlight and then adding in the Silverlight controls you would like mixed in. This allows for even more flexible designs where Silverlight controls make more sense then converted X/HTML ones.

The invention claimed is:

1. A method for losslessly converting an eXtensible HyperText Markup Language (X/HTML) source file, utilizing an X/HTML specification, into a web application adapted to run in a Silverlight® run time environment, the method being carried out in a memory of a computing device having a processor configured to process information, the method comprising the following steps:
    (a) converting elements of the X/HTML specification into a series of Silverlight® custom controls with a visual presentation attributable to the X/HTML elements;
    (b) converting the X/HTML source file to eXtensible Application Markup Language (XAML); and
    (c) combining the converted XAML and Silverlight® custom controls into a web application,
    wherein the step of combining the converted XAML and the Silverlight® custom controls into the web application comprises the following steps:
        (a) loading the Silverlight® custom controls;
        (b) loading the converted XAML;
        (c) passing the converted XAML to an XamlReader.Load( )method,
    wherein the XamlReader.Load()method will return the root of an object tree; and
        (d) adding the object tree to a running Silverlight® application.

2. The method of claim 1, wherein the step of converting elements of the X/HTML specification into a series of custom controls with the visual presentation attributable to the X/HTML elements is comprised of:
    (a) identifying elements in the X/HTML information;
    (b) for each of the elements identified, creating a custom control with basic compatibility, that is consistent with the attributes of that element;
    (c) adding the unique features of the X/HTML elements identified to their corresponding custom control; and
    (d) adding a custom user interface desired for the custom control.

3. The method of claim 2, wherein the step of creating for each identified element, a custom control with basic compatibility, is comprised of the following steps:

(a) creating a specially named new class derived from either the ItemsControl class or the Control class; and
(b) creating the attributes of the element in the class.

4. The method of claim 3, wherein the step of creating a specially named new class is comprised of the following steps:
   (a) identifying the name of the element that the new class is to represent; and
   (b) identifying whether the identified element name conflicts with an Object or other name in Silverlight®, if there is no conflict, creating a class with the name being the same as the element name, if there is a conflict, then prefixing the class name with a prefix that removes the conflict.

5. The method of claim 3, wherein an appropriate control class for an element is chosen using the following steps:
   (a) identifying whether the element contains sub elements;
   (b) if the element can contain sub elements, then the appropriate control class to inherit from is the ItemsControl class; and
   (c) if the element cannot contain any sub-elements, the appropriate class to inherit from is the Control class.

6. The method as defined in claim 5, wherein the step of identifying whether the element contains sub elements includes identifying whether the content model is not empty.

7. The method of claim 3, wherein the step of creating the attributes of the element in the class involves creating a dependency property with the same name as the attribute.

8. The method of claim 2, wherein the step of adding the unique features of the elements to their corresponding custom control is comprised of the following steps:
   (a) setting up event handler attributes;
   (b) setting up a visual state manager; and
   (c) adding the abilities that mimic the X/HTML element.

9. The method of claim 2, wherein the step of adding the custom user interface desired for the custom control is comprised of the following steps:
   (a) creating a generic.xaml file;
   (b) creating the visual presentation of the element in the generic.xaml file; and
   (c) setting the default style key of the custom control to the type of that custom control.

10. The method of claim 9, wherein the step of creating a generic.xaml file is comprised of the following steps:
    (a) in a class project, creating a new folder; and
    (b) adding a new Silverlight® Resource Dictionary named generic.xaml in the new folder, which becomes the default area for the visual presentation of custom controls.

11. The method of claim 9, wherein the step of creating the visual presentation of the element in the generic.xaml file is comprised of the following steps:
    (a) choosing a look for the custom control;
    (b) designing the look in XAML;
    (c) if there is to be nested controls in the element, adding a ItemsPresenter in the position that the nested controls are to appear; and
    (d) replacing the XAML_placeholder with the XAML in the following elements:

```
<Style TargetType="customcontrol">
        <Setter Property="FontSize" Value="15"/>
        <Setter Property="FontFamily" Value="Times New Roman"/>
        <Setter Property= "xhtml:Box.LayoutMode" Value="Inline"/>
        <Setter Property="Template">
            <Setter.Value>
                <ControlTemplate TargetType="customcontrol_name">
                    XAML_placeholder
                </ControlTemplate>
            </Setter.Value>
        </Setter>
</Style>.
```

12. The method of claim 11, wherein the step of designing the look in XAML is comprised of the following steps:
    (a) choosing a designer tool for the creation on XAML;
    (b) drawing the custom control;
    (c) if a program other than Expression Blend® is used to draw the control, importing the custom control into Expression Blend®; and
    (d) saving the resulting XAML, wherein the XAML is the visual presentation of the custom control.

13. The method as defined in claim 11, wherein the nested controls include text.

14. The method of claim 9, wherein the step of setting the default style key of the custom control to the type of that custom control is comprised of the following steps:
    (a) creating the public constructer of the custom control; and
    (b) inserting the following line of code:
    this.DefaultStyleKey=this.GetType( ).

15. The method of claim 1, wherein the step of converting X/HTML into XAML comprises the following steps:
    (a) loading the X/HTML information into memory;
    (b) if the X/HTML information is HTML information, then converting the HTML information to X/HTML using the following process:
        (i) wrapping quotes around the values of attributes;
        (ii) setting all attributes and elements to lower case;
        (iii) closing any elements which are left open;
        (iv) extending any attribute values that are using shorthand notation;
    (c) thereafter, or in the case of converting existing XHTML information, the process of converting X/HTML to XAML involves the following:
        (i) prefixing X/HTML elements with a library address namespace;
        (ii) wrapping the subject X/HTML code into a user control to produce a Silverlight® control; and
        (iii) fixing naming collisions;
    (d) wrapping in a valid control; and
    (e) outputting XAML.

* * * * *